United States Patent Office 3,577,245
Patented May 4, 1971

---

3,577,245
BORON NITRIDE ARTICLE HAVING IMPROVED THERMAL STABILITY
Herbert C. Quandt, Lakewood, Ohio, assignor to Union Carbide Corporation
No Drawing. Filed Nov. 3, 1967, Ser. No. 680,330
Int. Cl. C04b *33/00;* C01b *21/06*
U.S. Cl. 106—39     5 Claims

ABSTRACT OF THE DISCLOSURE

Method of improving the high temperature stability of boron nitride articles by treatment with calcium cyanamide.

---

This invention is related to the manufacture of boron nitride articles. More particularly, this invention is directed to the use of calcium cyanamide as an addition to boron nitride for the purpose of improving the thermal stability of such articles.

Boron nitride is rather widely used in the manufacture of articles intended for high temperature use such as crucibles for the vaporization of aluminum. However, hot-pressed boron nitride as it is commercially produced contains minor amounts of boric oxide, $B_2O_3$ as an impurity, e.g., from about 3 to 13%, and if steps are not taken to neutralize the boric oxide, the in-service properties of the boron nitride are detrimentally affected in many instances. For example, in moist environment, the boric oxide in a boron nitride article will be converted to boric acid with resultant deterioration of the boron nitride article on rapid heating. Also, boric acid will react with molten aluminum at temperatures ordinarily used in aluminum vaporization operations with the result that the molten aluminum is violently agitated by the hydrogen gas generated which can lead to the expulsion of aluminum from a boron nitride crucible.

It is therefore an object of the present invention to provide a method for improving the thermal properties of articles formed of boron nitride.

It is another object of the present invention to provide an improved boron nitride article.

Other objects will be apparent from the following description and claims.

Broadly, the present invention comprises the manufacture of a thermally stable hot pressed boron nitride shape by heat-treating boric oxide-containing boron nitride in contact with calcium cyanamide whereby boric oxide contaminant in the boron nitride is converted to calcium orthoborate.

In a particular embodiment of the present invention finely divided boron nitride, e.g., sized through 200 mesh Tyler screen series is blended with finely divided calcium cyanamide, e.g., sized 100 to 200 mesh Tyler screen series and the mixture is hot pressed to form a desired shape. In the hot pressing operation pressures of from about 1800 to 2200 p.s.i. can be used at temperatures of from about 1700° C. to 1900° C. Holding periods of from 15 to 30 minutes have been found suitable.

It is important in the practice of this embodiment of the present invention that the amount of calcium cyanamide used be in the range of from about 0.1 to 1.15 times the boric oxide content of the boron nitride material. Ordinarily the boric oxide content of commercial boron nitride ranges from 3 to 13% and thus calcium cyanmide additions in the range of from about .3 to 15% are suitable.

By following the aforedescribed practice, the boric oxide in the boron nitride material is substantially converted to calcium orthoborate and boron nitride, with the evolution of $CO_2$, and as a result the final boron nitride shape does not contain any residual contaminants, e.g., CaO, which adversely affect the high temperature properties of the material. The following equation describes the formation of calcium orthoborate through reaction between calcium cyanamide and the boric oxide contaminant in boron nitride.

$$2CaCN_2 + 3B_2O_3 \rightarrow Ca_2B_2O_5 + 4BN + 2CO_2$$

Boron nitride shapes prepared in the manner aforedescribed are characterized by improved high temperature stability, increased high temperature strength and reduced moisture pick-up, i.e., reduced moisture sensitivity.

It has also been found that the use of calcium cyanamide additions outside of the range mentioned above does not provide the desired improvements. At calcium cyanamide ratios below 0.1 no significant improvements are obtained while calcium cyanamide ratios above 1.15 resulted in products which exfoliated upon exposure to moisture.

In a further embodiment of the present invention, calcium cyanamide, in the desired amount, is produced in situ, in the course of hot pressing by the reaction of admixed urea, $CO(NH_2)_2$ and CaO, in about a 1:1 molar ratio.

In a further embodiment of the present invention, a hot pressed boron nitride shape is provided with improved thermal stability by heating the boron nitride article in contact with finely divided calcium cyanamide, for example by packing the surface to be protected with finely divided calcium cyanamide, e.g., sized 100 to 200 mesh and heating the packed article to a temperature in the range of from 1300° C. to 1500° C. to cause a reaction between the boric oxide and contacting calcium cyanamide. Ordinarily heating times of from 5 to 10 minutes are satisfactory for this purpose. In this embodiment of the invention the surface of the boron nitride shape is rendered moisture resistant and thermally stable and articles thus treated provide excellent performance when used as aluminum vaporization vessels.

The following examples will further illustrate the present invention.

EXAMPLE I

Boron nitride sized through 200 mesh and containing 3.75% by weight oxygen (5.45% $B_2O_3$) was blended with 2% by weight technical grade calcium cyanamide to provide a ratio of calcium cyanamide to boric oxide of 0.4:1. A portion of this mixture in the amount of 16.5 grams was hot pressed under vacuum to a pressure of 2160 p.s.i. at 1700° C. and held at this temperature and pressure for 30 minutes. The resultant cylindrically shaped article was 1.089 inches in height and had a diameter of 0.752 inch. The density of the article was 2.00 gm./cm.³ and weighed 15.79 grams. A ⅜ inch diameter hole ¾ inch deep was drilled in the article and the hole filled with 1.81 g. of aluminum. The aluminum filled article was heated to 1400° C. at $6 \times 10^{-4}$ mm. absolute pressure. The article did not cause agitation of molten aluminum despite prior exposure to a moist atmosphere.

EXAMPLE II

A hot pressed block of boron nitride (¾ inch x ¾ inch x 1½ inches) containing about 5% by weight oxygen (about 7% $B_2O_3$) was converted into a container by drilling a ⅜ inch diameter hole 1 inch deep in the long dimension. Technical grade calcium cyanamide, in the amount of 0.1 gram was placed in the thus prepared container which was heated to 1500° C. under one-half atmosphere helium pressure and held for 10 min. and cooled to room temperature. The container was exposed to air at 100% relative humidity at room temperature for twenty hours and then loaded with aluminum metal and heated to 1400° C. under a vacuum of $6 \times 10^{-4}$ mm.

There was no agitation of the molten aluminum in the crucible.

The test was repeated using a similar boron nitride container but without the calcium cyanamide treatment and resulted in violent eruption of molten aluminum.

EXAMPLE III

Boron nitride sized through 200 mesh in the amount of 100 grams containing 3.75% by weight oxygen (5.45% $B_2O_3$) was blended with 1.2 grams of urea and 1.1 grams of calcined calcium oxide. A portion of the blended mixture in the amount of 14.5 grams ws hot pressed under vacuum to a pressure of 2160 p.s.i. at 1800° C. and held at this temperature and pressure for 30 minutes. The resultant cylindrically shaped article was 1.009 inches in height and had a diameter of 0.753 inch. The density of the article was 1.99 gms./cm.$^3$ and weighed 14.465 grams.

This article was exposed to air at 100% relative humidity at room temperature for 176 hours and showed a weight gain of 0.49 percent.

Similar articles made from the same boron nitride materials and in the same manner but with no addition showed a weight gain of 2.5% under the same test conditions.

The mesh sizes referred to herein are Tyler Series.

What is claimed is:

1. A method of making a boron nitride article having improved high temperature stability which comprises hot pressing a mixture of finely divided boron nitride and calcium cyanamide at an elevated temperature for a time sufficient to cause reaction between the impurities of boric oxide contained in the boron nitride material and said calcium cyanamide, the amount of calcium cyanamide in the mixture being between from about 0.1 to 1.15 times the boric oxide content of the boron nitride.

2. A method in accordance with claim 1 wherein the hot pressing is conducted in the temperature range of 1700 to 1900° C.

3. A method in accordance with claim 1 wherein the mixture of boron nitride and calcium cyanamide is hot pressed at pressures of from about 1800 to 2200 p.s.i.

4. A method in accordance with claim 1 wherein the amount of calcium cyanamide is about 0.4 times the boric oxide content of the boron nitride.

5. A method in accordance with claim 1 wherein the calcium cyanamide is formed in situ during hot pressing by the reaction of urea and calcium oxide in about a 1:1 molar ratio.

References Cited

UNITED STATES PATENTS

| | | | |
|---|---|---|---|
| 1,842,018 | 1/1932 | Germann | 23—78 |
| 2,834,650 | 5/1958 | Conant et al. | 23—191 |
| 3,240,563 | 3/1966 | Mercuri et al. | 23—191 |

TOBIAS E. LEVOW, Primary Examiner

M. L. BELL, Assistant Examiner

U.S. Cl. X.R.

106—55; 23—191